(12) United States Patent
Nakao

(10) Patent No.: US 9,178,425 B2
(45) Date of Patent: Nov. 3, 2015

(54) POWER SUPPLY DEVICE

(71) Applicant: FUJITSU LIMITED, Kawasaki-shi, Kanagawa (JP)

(72) Inventor: Hiroshi Nakao, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/574,660

(22) Filed: Dec. 18, 2014

(65) Prior Publication Data

US 2015/0207409 A1 Jul. 23, 2015

(30) Foreign Application Priority Data

Jan. 21, 2014 (JP) .................... 2014-008723

(51) Int. Cl.
 *G05F 1/00* (2006.01)
 *H02M 3/158* (2006.01)

(52) U.S. Cl.
 CPC ...................... *H02M 3/158* (2013.01)

(58) Field of Classification Search
 CPC ........................ H02M 3/156; H02M 2003/1566
 USPC .......................................... 323/271, 282–285
 See application file for complete search history.

(56) References Cited

U.S. PATENT DOCUMENTS

| | | | | |
|---|---|---|---|---|
| 4,344,121 A * | 8/1982 | Weber | ............................. | 363/16 |
| 5,757,173 A * | 5/1998 | Agiman | ........................ | 323/282 |
| 6,094,039 A * | 7/2000 | Farrenkopf | .................... | 323/283 |
| 7,764,054 B1 * | 7/2010 | Guo et al. | ...................... | 323/224 |
| 2003/0231010 A1 | 12/2003 | Sase et al. | | |
| 2005/0029997 A1 | 2/2005 | Sase et al. | | |
| 2005/0127886 A1 | 6/2005 | Sase et al. | | |
| 2008/0315851 A1* | 12/2008 | Akiyama et al. | ............... | 323/284 |
| 2010/0127679 A1* | 5/2010 | Satterfield | ..................... | 323/282 |
| 2012/0126768 A1* | 5/2012 | Ishino | ............................ | 323/283 |
| 2013/0043851 A1* | 2/2013 | Ishino | ............................ | 323/282 |
| 2014/0159686 A1* | 6/2014 | Lee et al. | ...................... | 323/282 |

FOREIGN PATENT DOCUMENTS

JP 2004-080985 3/2004

* cited by examiner

*Primary Examiner* — Adolf Berhane
*Assistant Examiner* — Henry Lee, III
(74) *Attorney, Agent, or Firm* — Fujitsu Patent Center

(57) ABSTRACT

A power supply device has a first delay circuit which delays a first clock signal and outputs a second clock signal, a pulse signal generating circuit which generates a first pulse signal, a first transistor which connects an output node to a power supply potential node according to the first pulse signal, a second transistor which connects the output node to a reference potential node according to the first pulse signal, an integration circuit which integrates and outputs a signal of the output node, and a comparator which compares an output signal of the integration circuit and the reference signal, wherein the pulse signal generating circuit generates the first pulse signal in synchronization with the first clock signal, the second clock signal and the output signal of the comparator, and the frequency of the first pulse signal is constant irrespective of voltage of the output node.

9 Claims, 12 Drawing Sheets

F I G. 6
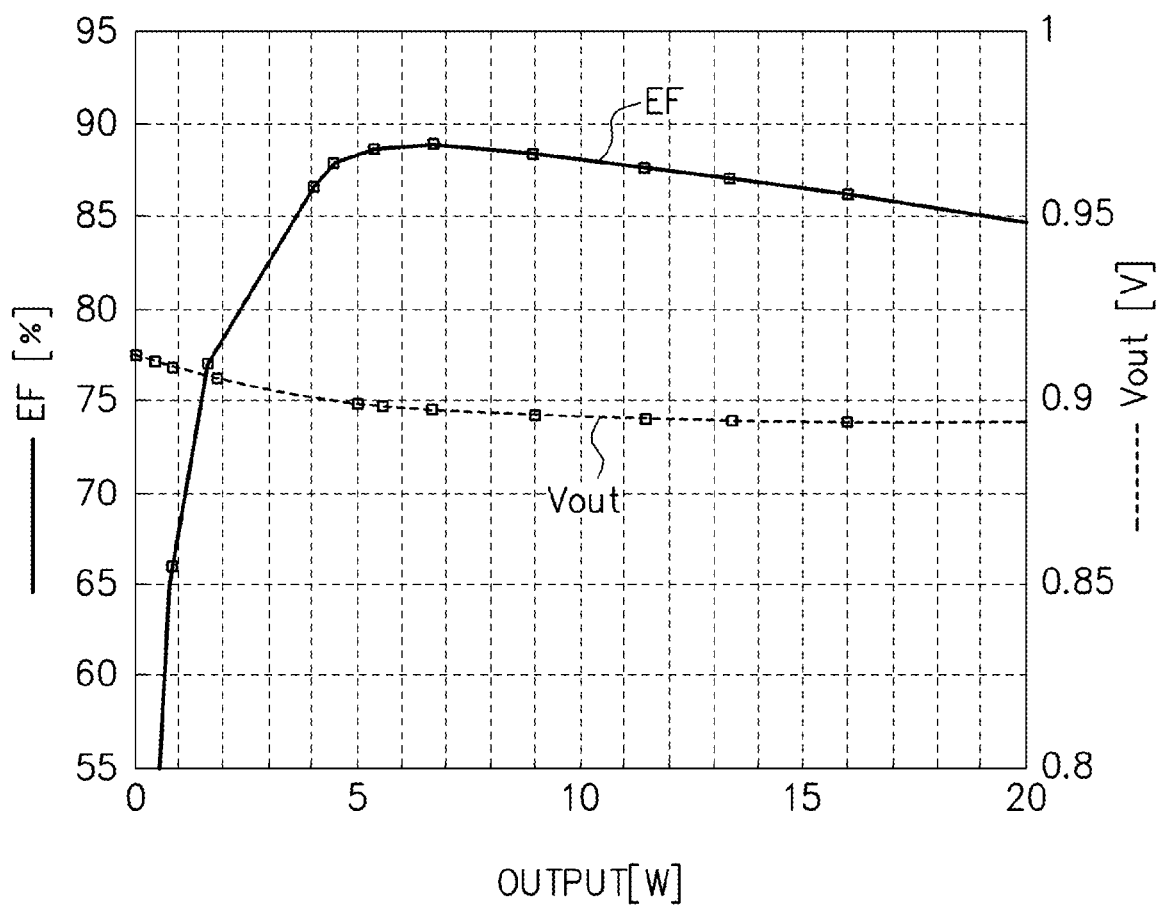

F I G. 11A
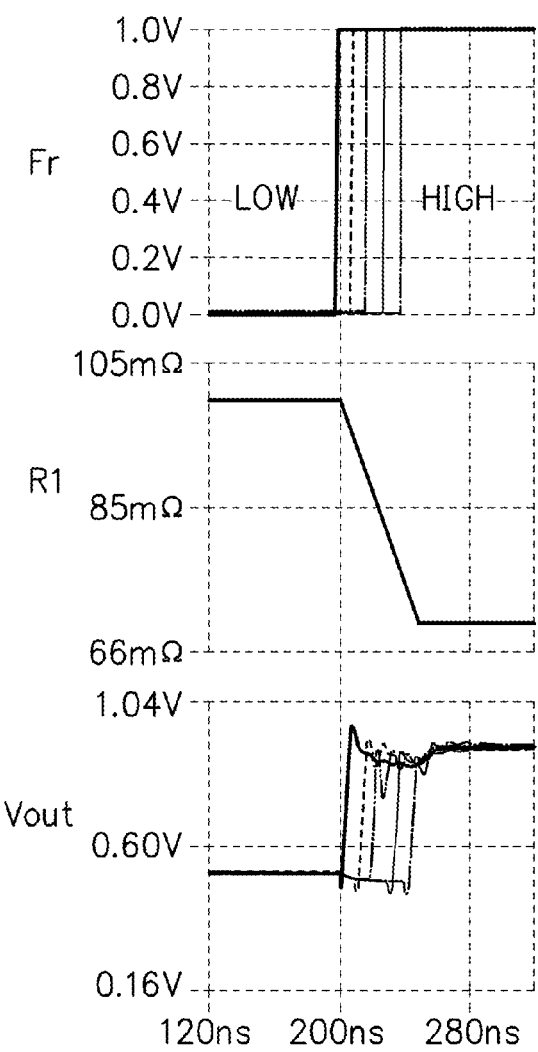
F I G. 11B
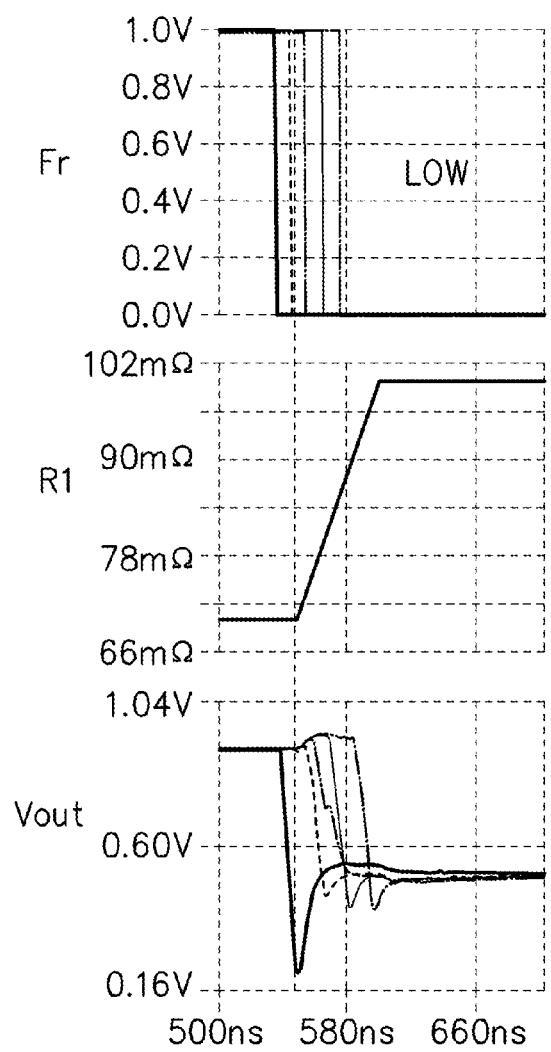

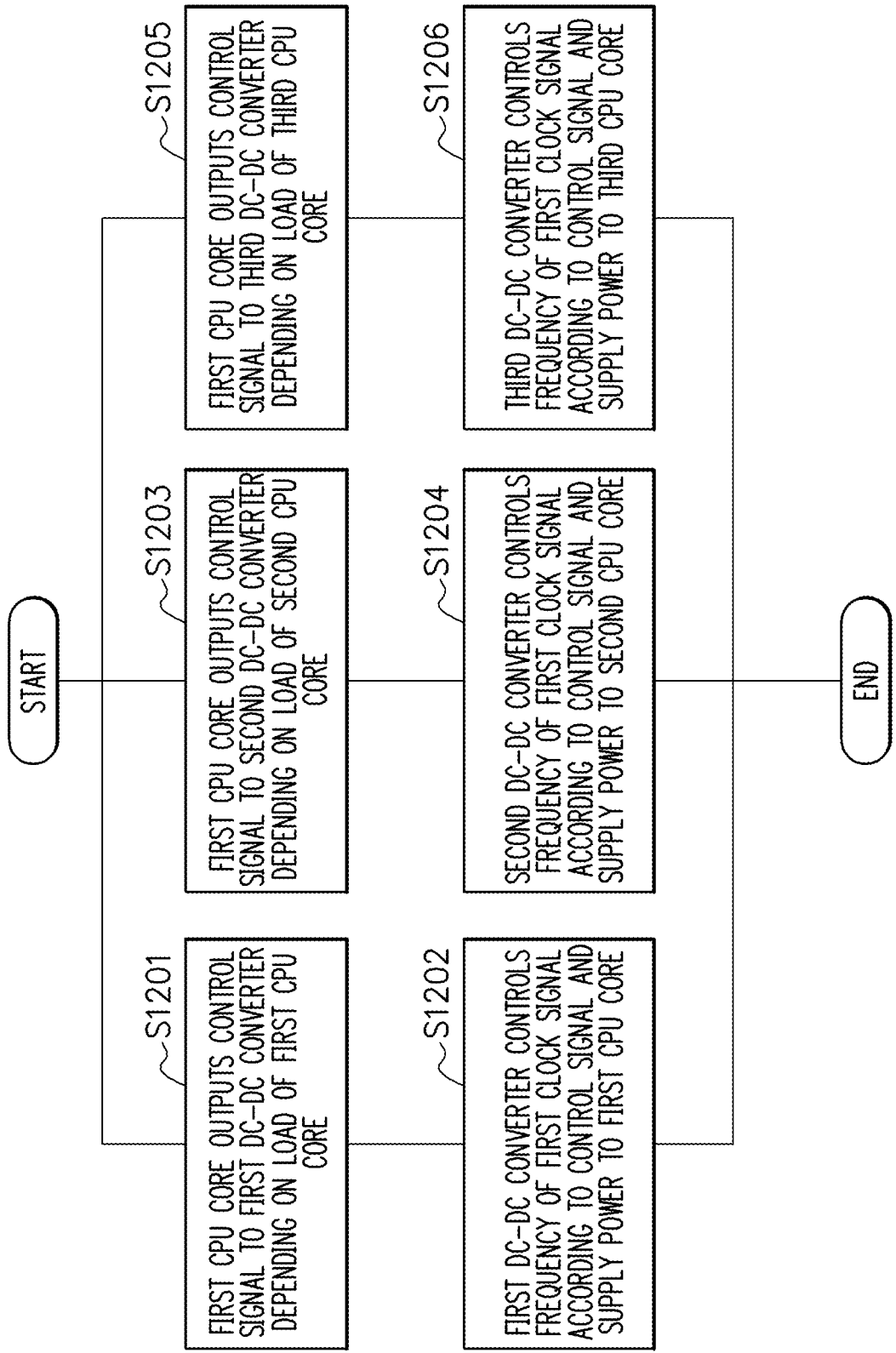

US 9,178,425 B2

POWER SUPPLY DEVICE

CROSS-REFERENCE TO RELATED APPLICATION

This application is based upon and claims the benefit of priority of the prior Japanese Patent Application No. 2014-008723, filed on Jan. 21, 2014, the entire contents of which are incorporated herein by reference.

FIELD

The embodiments discussed herein are directed to a power supply device.

BACKGROUND

Dynamic voltage and frequency scaling (DVFS) is a technique to reduce power consumption by dynamically controlling supply voltage and an operating frequency of a processor depending on a load.

There has been known a power supply device of a step-down DC-DC converter having a power semiconductor switching element, a driving unit for the power semiconductor switching element, a pulse-width modulating oscillator supplying a drive signal to the driving unit, and an error amplifier supplying an error signal to the oscillator (see, for example, Patent Literature 1). The power supply device has a power system output filter passing output power and a filter provided separately from the power-system output filter, and feeds back an output signal to the error amplifier by directly coupling an output of the separately provided filter and a differential amplifier in the error amplifier.

Patent Literature 1: Japanese Laid-open Patent Publication No. 2004-80985

To adjust supply voltage corresponding to a load fluctuation of the processor, a switching frequency equal to that of the reference clock signal of the processor is needed. Accordingly, a high-speed DVFS is desired. However, when the switching frequency changes depending on the load of the processor, it is difficult to supply large power to the processor.

SUMMARY

A power supply device has: a first delay circuit which delays a first clock signal and outputs a second clock signal; a pulse signal generating circuit which generates a first pulse signal in synchronization with the first clock signal; a first transistor which connects an output node to a power supply potential node according to the first pulse signal; a second transistor which connects the output node to a reference potential node according to the first pulse signal; an integration circuit which integrates and outputs a signal of the output node; and a comparator which compares an output signal of the integration circuit and the reference signal, wherein the first transistor and the second transistor perform on and off operations which are reverse to each other, the pulse signal generating circuit sets the first pulse signal to first level in synchronization with the first clock signal, sets the first pulse signal to second level in synchronization with the second clock signal, and sets the first pulse signal to the second level in synchronization with an output signal of the comparator, and the frequency of the first pulse signal is constant irrespective of voltage of the output node.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a graph illustrating output voltage and efficiency with respect to output power;

FIG. 11A is a waveform diagram of the frequency control signal and the output voltage when the load resistor suddenly changes;

FIG. 11B is a waveform diagram of the frequency control signal and the output voltage when the load resistor suddenly changes; and FIG. 12 is a flowchart illustrating a control method of the power supply devices and the processors (processing devices).

DESCRIPTION OF EMBODIMENTS

First Embodiment

Figure 1:
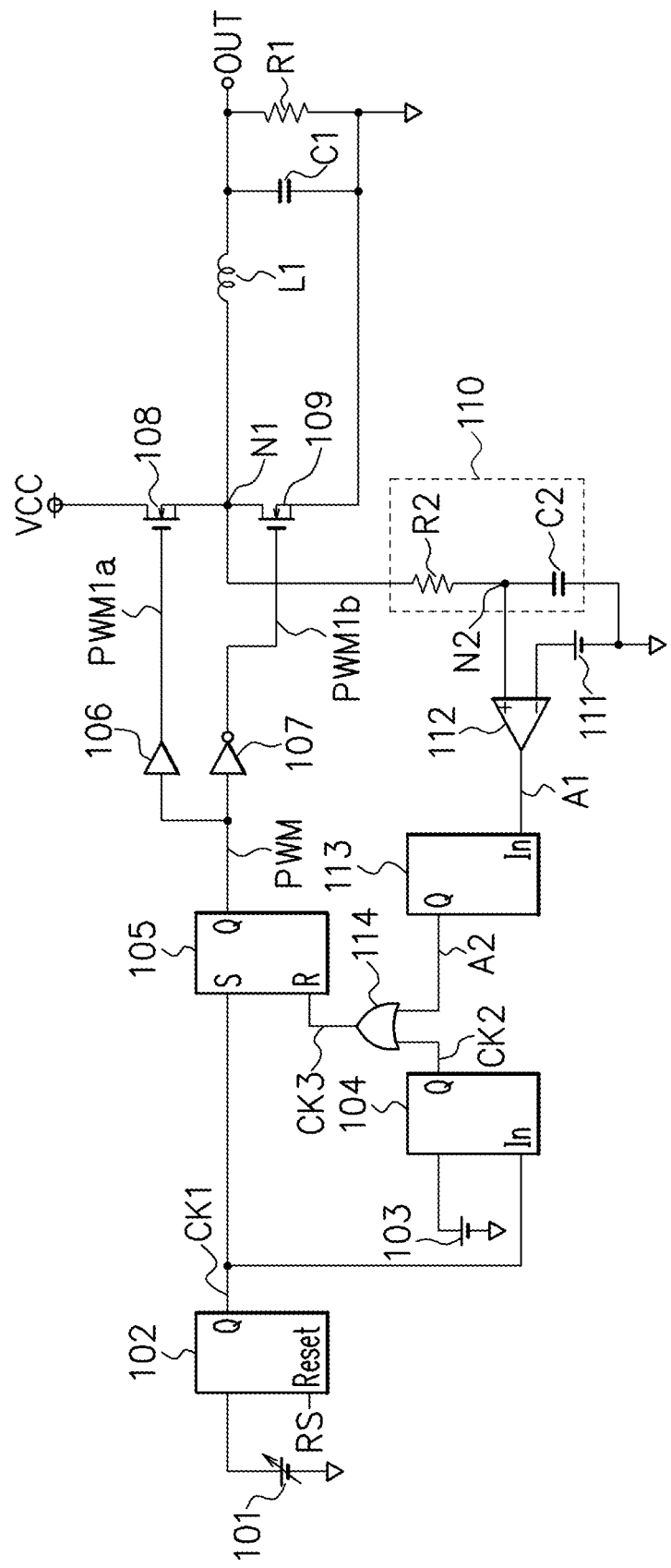
FIG. 1 is a diagram illustrating a structural example of a power supply device according to a first embodiment.
Figure 2:
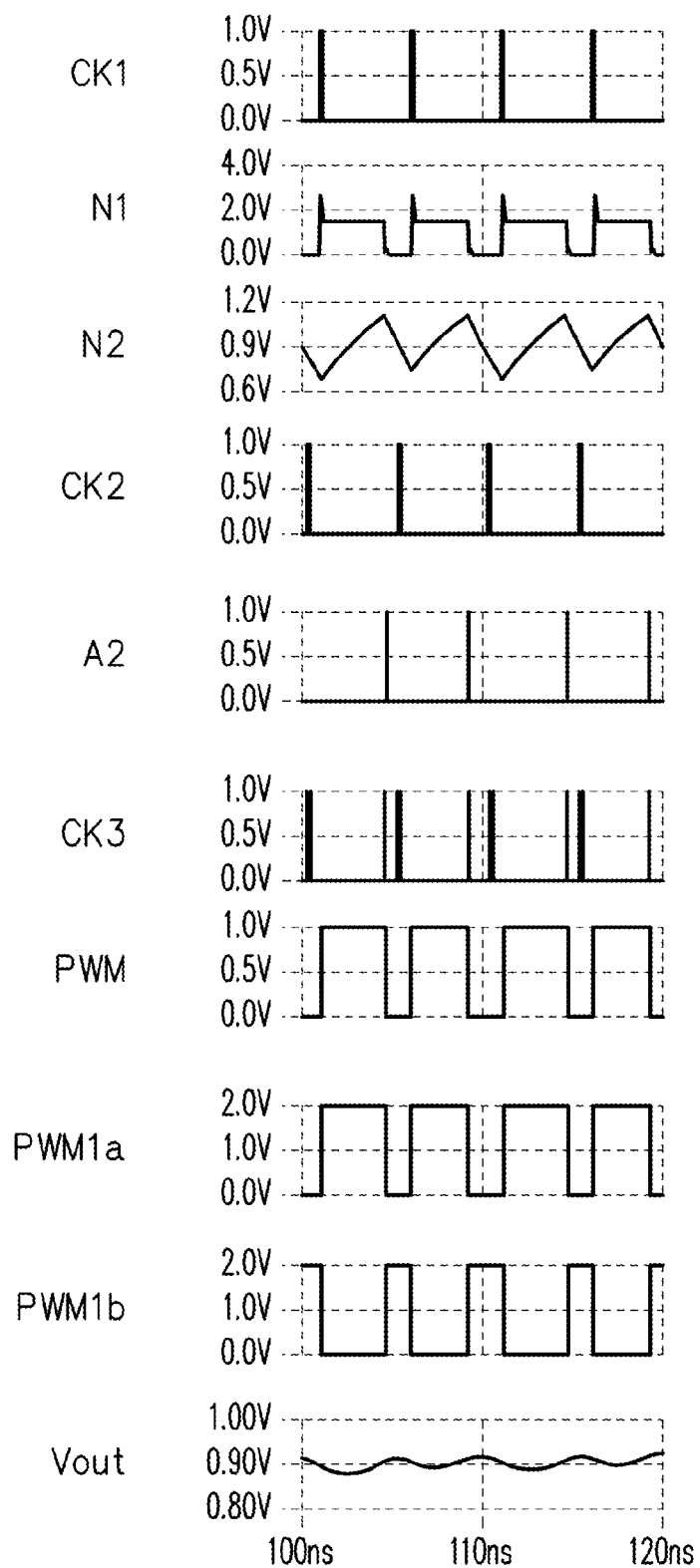
FIG. 2 is a diagram illustrating voltage waveforms of the power supply device of FIG. 1.

FIG. 1 is a diagram illustrating a structural example of a power supply device according to a first embodiment. FIG. 2 is a diagram illustrating voltage waveforms of the power supply device of FIG. 1. The power supply device is a DC(direct current)-DC converter supplying voltage (power) to a processor such as a central processing unit (CPU) from an output node OUT.

A voltage-controlled oscillator (VCO) 102 outputs a first clock signal CK1 with a frequency according to voltage or the like of the direct-current power supply 101 to a set terminal S of an RS flip-flop 105. For example, the first clock signal CK1 is 200 MHz. A first delay circuit 104 delays the first clock signal CK1 with a delay time according to voltage of a direct-current power supply 103 and outputs a second clock signal CK2. The RS flip-flop 105 is a pulse signal generating circuit which generates a first pulse signal PWM in synchronization with the first clock signal CK1. A gate driver 106 is a buffer, amplifies the first pulse signal PWM and outputs a pulse signal PWM1a. A gate driver 107 is an inverter, inverts and amplifies the first pulse signal PWM and outputs a pulse signal PWM1b. The pulse signals PWM1a and PWM1b are signals logically inverted from each other.

A first transistor 108 is an n-channel field-effect transistor and has a drain connected to a power supply potential node VCC (1.8 V) and a gate connected to a line of the pulse signal PWM1a, and a source connected to an output node N1. The first transistor 108 connects the output node N1 to the power supply potential node VCC when voltage of the pulse signal PWM1a is at high level or disconnects the output node N1 from the power supply potential node VCC when the voltage of the pulse signal PWM1a is at low level. When the voltage of the pulse signal PWM1a is higher than a threshold it is determined as high level, or when the voltage of the pulse signal PWM1a is lower than the threshold it is determined as low level.

A second transistor 109 is an n-channel field effect transistor and has a drain connected to the output node N1, a gate connected to a line of the pulse signal PWM1b, and a source connected to a reference potential node (ground potential node). The second transistor 109 connects the output node N1 to the reference potential node when the pulse signal PWM1b is at high level or disconnects the output node N1 from the reference potential node when the pulse signal PWM1b is at low level. The first transistor 108 and the second transistor 109 perform on and off operations which are reverse to each other.

An inductor L1 is connected between the output nodes N1 and OUT. A capacitor C1 is connected between the output node OUT and the reference potential node. A load resistor (load impedance) R1 is connected between the output node OUT and the reference potential node. An integration circuit 110 is an RC filter having a resistor R2 and a capacitor C2, integrates a signal of the output node N1 and outputs an integrated signal from a node N2.

A comparator 112 compares the signal (voltage) of the node N2 with a reference signal (voltage) of a direct current power supply 111 and outputs a signal A1 at high level when the signal of the node N2 is larger than the reference signal (set to, for example, 1.1 V here) or outputs a signal A1 at low level when the signal of the node N2 is smaller than the reference signal (1.1 V). When the voltage of the direct current power supply 111 is the reference signal and voltage Vout of the output node OUT is desired to be set to 0.9 V, the reference signal is set to 1.1 V for example. An edge extracting circuit 113 extracts a rising edge of the signal A1 and outputs an edge signal A2. The rising edge of the signal A1 is a part where the signal A1 changes from low level to high level, and for example, upon detecting the part where the signal A1 changes from low level to high level, the edge extracting circuit 113 outputs the edge signal A2 with high-level pulses. A logical sum (OR) circuit 114 outputs a logical sum signal CK3 of the second clock signal CK2 and the edge signal A2 to a reset terminal R of an RS flip-flop 105.

When a high-level pulse of the first clock signal CK1 is inputted, the RS flip-flop 105 changes the first pulse signal PWM to high level, or when a high-level pulse of the signal CK3 is inputted, it changes the first pulse signal PWM to low level. Specifically, the RS flip-flop 105 changes the first pulse signal PWM to high level (first level) in synchronization with the first clock signal CK1, changes the first pulse signal PWM to low level (second level) in synchronization with the second clock signal CK2, and changes the first pulse signal PWM to low level (second level) in synchronization with the signal A2.

In the first clock signal CK1, high-level pulses are generated at constant cycles of $1/200$ MHz. When the first clock signal CK1 becomes high-level pulses, the first pulse signal PWM becomes high level, the first transistor 108 turns on, and the second transistor 109 turns off. Thus, the output node N1 is connected to the power supply potential node VCC and becomes 1.8 V.

The capacitor C1 is charged, and the voltage Vout of the output node OUT increases.

In a period where the output node N1 is 1.8 V, the voltage of the node N2 increases by the integration circuit 110. When the voltage of the node N2 becomes higher than the reference voltage (1.1 V) of the direct current power supply 111, the output signal A1 of the comparator 112 changes from low level to high level. Then, the edge extracting circuit 113 extracts the rising edge of the output signal A1 and outputs the edge signal A2 with high-level pulses. Then, the RS flip-flop 105 changes the first pulse signal PWM to low level. Then, the first transistor 108 turns off, and the second transistor 109 turns on. Thus, the output node N1 is connected to the reference potential node, becoming 0 V. The capacitor C1 is discharged and the voltage Vout of the output node OUT drops.

In the voltage Vout of the output node OUT, the voltage of the output node N1 becomes smoothed voltage, maintaining voltage of approximately 0.9 V. When the load resistor R1 fluctuates, the voltage of the output node N1 can be kept to approximately 0.9 V by the comparator 112. Thus, the frequency of the first pulse signal PWM becomes constant at 200 MHz irrespective of the voltage of the output node N1. Similarly, the switching frequency of the first transistor 108 and the second transistor 109 also becomes constant at 200 MHz.

Next, operations in a period in which the voltage Vout of the output node OUT increases from 0 V to 0.9 V like when power is turned on will be described. In this period, the voltage of the node N2 is lower than the reference voltage of the direct current power supply 111, and thus the signal A2 does not become high-level pulses. In this case, the signal CK3 becomes the same signal as the second clock signal CK2. The second clock signal CK2 becomes high-level pulses at constant cycles of $1/200$ MHz. In this case, the RS flip-flop 105 changes the first pulse signal PWM to low level at constant cycles of $1/200$ MHz. Specifically, the first pulse signal PWM becomes high level when a high level pulse of the first clock signal CK1 is inputted, or becomes low level when a high level pulse of the second clock signal CK2 is inputted. The first pulse signal PWM has a quite long high level period compared to the low-level period, and thus the voltage Vout of the output node OUT increases toward 0.9 V from 0 V. Also in this case, the frequency of the first pulse signal PWM becomes constant at 200 MHz irrespective of the voltage of the output node N1. Similarly, the switching frequency of the first transistor 108 and the second transistor 109 also becomes constant at 200 MHz.

Further, when the voltage of the node N2 does not exceed the reference voltage of the direct current power supply 111 due to a load fluctuation, the first pulse signal PWM becomes forcible low level by the high level pulse of the second clock signal CK2. Thus, the frequency of the first pulse signal PWM becomes constant at 200 MHz.

Note that the transistors 108 and 109 are not limited to the MOS (metal oxide semiconductor) field-effect transistor, and can also be a high electron mobility transistor (HEMT) of GaN (gallium nitride). When the transistors 108 and 109 are the high electron mobility transistors, their gate capacity becomes small, and thus a switching loss thereof decreases and efficiency improves. Further, switching speeds of the high electron mobility transistors 108 and 109 become high, and thus the power supply device becomes capable of performing high-frequency switching, which improves a response of the output voltage Vout relative to the load fluctuation.

Second Embodiment

Figure 3:
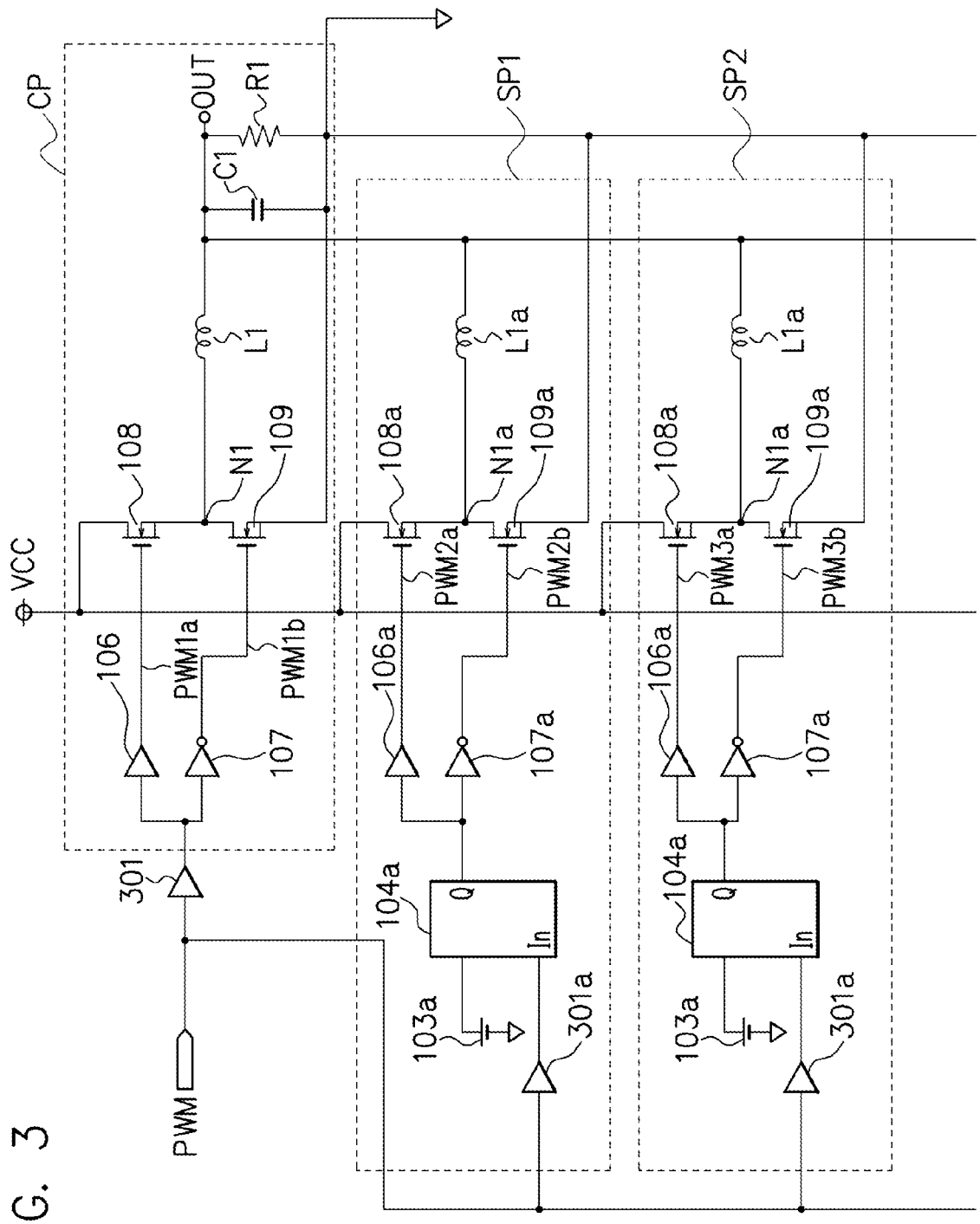
FIG. 3 is a diagram illustrating a structural example of a power supply device according to a second embodiment.
Figure 4:
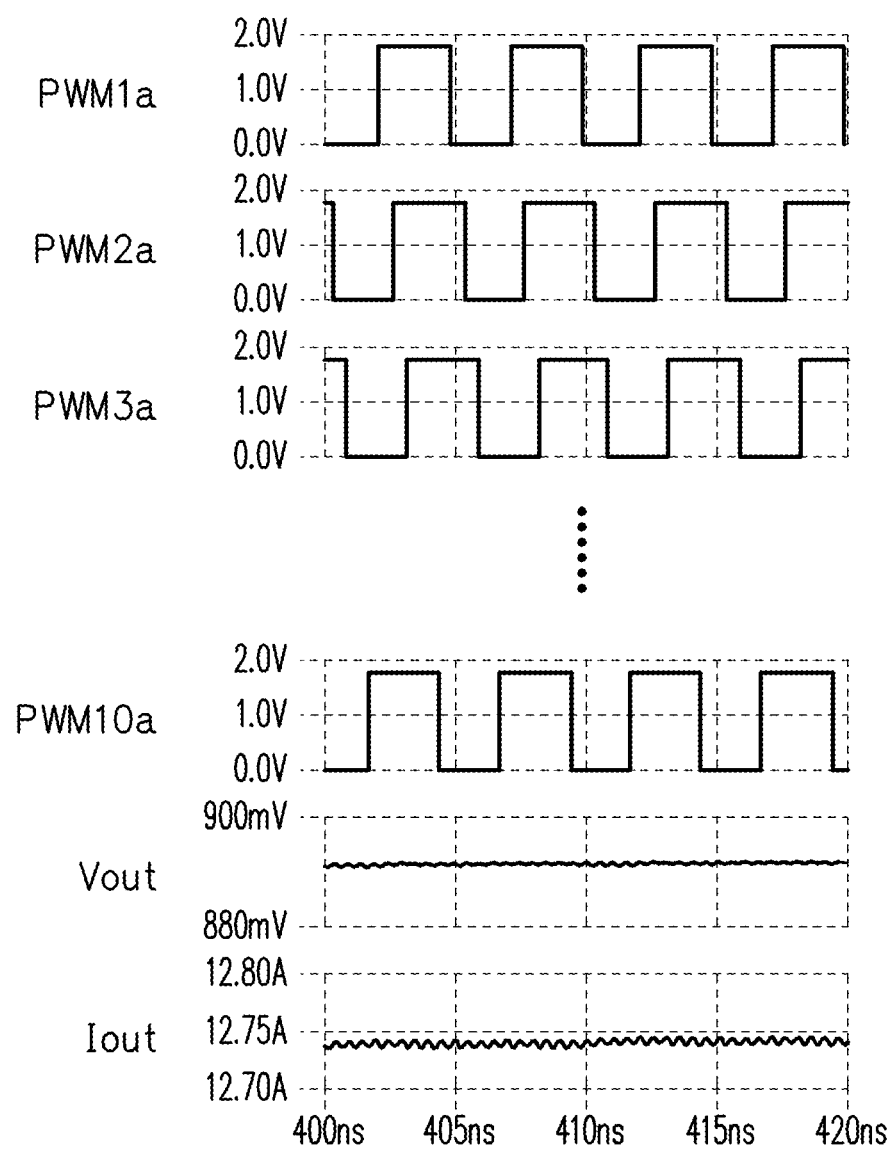
FIG. 4 is a diagram illustrating voltage waveforms of a power supply device of FIG. 3.

FIG. 3 is a diagram illustrating a structural example of a power supply device according to a second embodiment, and FIG. 4 is a diagram illustrating voltage waveforms of a power supply device of FIG. 3. This embodiment (FIG. 3) is made by adding nine sub-phase circuits SP1 to SP9 to the first embodiment (FIG. 1). Note that in FIG. 3, a circuit of a preceding stage of a pulse signal PWM is omitted, but the circuit of the preceding stage of the signal PWM is the same as that of FIG. 1. Hereinafter, differences of this embodiment from the first embodiment will be described. The sub-phase circuits SP1 to SP9 have the same structure as a control phase circuit CP and are connected in parallel to the control phase circuit CP. A buffer 301 amplifies a first pulse signal PWM and outputs the signal to gate drivers 106 and 107.

Next, a structure of the sub-phase circuit SP1 will be described. A buffer 301a amplifies and outputs the first pulse signal PWM. A second delay circuit 104a delays an output signal of the buffer 301a by a delay time according to voltage of a direct-current power supply 103a and outputs a second pulse signal to gate drivers 106a and 107a. The gate driver 106a is a buffer, amplifies a second pulse signal outputted by the second delay circuit 104a and outputs a pulse signal PWM2a. The gate driver 107a is an inverter, inverts and amplifiers the second pulse signal outputted by the second delay circuit 104a and outputs a pulse signal PWM2b. The pulse signals PWM2a and PWM2b are signals logically inverted from each other.

A third transistor 108a is an n-channel field-effect transistor and has a drain connected to a power supply potential node VCC (1.8 V), a gate connected to a line of the pulse signal PWM2a, and a source connected to an output node N1a. The first transistor 108a connects the output node N1a to the power supply potential node VCC when the pulse signal PWM2a is at high level or disconnects the output node N1a from the power supply potential node VCC when the pulse signal PWM2a is at low level.

A fourth transistor 109a is an n-channel field effect transistor and has a drain connected to the output node N1a, a gate connected to a line of the pulse signal PWM2b, and a source connected to a reference potential node (ground potential node). The fourth transistor 109a connects the output node N1a to the reference potential node when the pulse signal PWM2b is at high level or disconnects the output node N1a from the reference potential node when the pulse signal PWM2b is at low level. The third transistor 108a and the fourth transistor 109a perform on and off operations which are reverse to each other. An inductor L1a is connected between the output nodes N1a and OUT.

A delay time of the delay circuit 104a of the sub-phase circuit SP1 is, for example, 1/(200 MHz×10). Therefore, the pulse signals PWM2a and PWM2b are signals delayed by a delay time of, for example, 1/(200 MHz×10) relative to the pulse signals PWM1a and PWM1b, respectively.

The structure of the sub-phase circuit SP1 is described for example, but the sub-phase circuits SP2 to SP9 also have the same structure as the sub-phase circuit SP1 and are connected in parallel to the sub-phase circuit SP1.

In the sub-phase circuit SP2, a gate signal of the transistor 108a is expressed as a pulse signal PWM3a, and a gate signal of the transistor 109a is expressed as a pulse signal PWM3b. A delay time of the delay circuit 104a of the sub-phase circuit SP2 is, for example, 2/(200 MHz×10). Therefore, the pulse signals PWM3a and PWM3b are signals delayed by a delay time of, for example, 2/(200 MHz×10) relative to the pulse signals PWM1a and PWM1b, respectively.

In the sub-phase circuit SP3, a gate signal of the transistor 108a is expressed as a pulse signal PWM4a, and a gate signal of the transistor 109a is expressed as a pulse signal PWM4b. A delay time of the delay circuit 104a of the sub-phase circuit SP3 is, for example, 3/(200 MHz×10). Therefore, the pulse signals PWM4a and PWM4b are signals delayed by a delay time of, for example, 3/(200 MHz×10) relative to the pulse signals PWM1a and PWM1b, respectively.

In the sub-phase circuit SP4, a gate signal of the transistor 108a is expressed as a pulse signal PWM5a, and a gate signal of the transistor 109a is expressed as a pulse signal PWM5b. A delay time of the delay circuit 104a of the sub-phase circuit SP4 is, for example, 4/(200 MHz×10). Therefore, the pulse signals PWM5a and PWM5b are signals delayed by a delay time of, for example, 4/(200 MHz×10) relative to the pulse signals PWM1a and PWM1b, respectively.

In the sub-phase circuit SP5, a gate signal of the transistor 108a is expressed as a pulse signal PWM6a, and a gate signal of the transistor 109a is expressed as a pulse signal PWM6b. A delay time of the delay circuit 104a of the sub-phase circuit SP5 is, for example, 5/(200 MHz×10). Therefore, the pulse signals PWM6a and PWM6b are signals delayed by a delay time of, for example, 5/(200 MHz×10) relative to the pulse signals PWM1a and PWM1b, respectively.

In the sub-phase circuit SP6, a gate signal of the transistor 108a is expressed as a pulse signal PWM7a, and a gate signal of the transistor 109a is expressed as a pulse signal PWM7b. A delay time of the delay circuit 104a of the sub-phase circuit SP6 is, for example, 6/(200 MHz×10). Therefore, the pulse signals PWM7a and PWM7b are signals delayed by a delay time of, for example, 6/(200 MHz×10) relative to the pulse signals PWM1a and PWM1b, respectively.

In the sub-phase circuit SP7, a gate signal of the transistor 108a is expressed as a pulse signal PWM8a, and a gate signal of the transistor 109a is expressed as a pulse signal PWM8b. A delay time of the delay circuit 104a of the sub-phase circuit SP7 is, for example, 7/(200 MHz×10). Therefore, the pulse signals PWM8a and PWM8b are signals delayed by a delay time of, for example, 7/(200 MHz×10) relative to the pulse signals PWM1a and PWM1b, respectively.

In the sub-phase circuit SP8, a gate signal of the transistor 108a is expressed as a pulse signal PWM9a, and a gate signal of the transistor 109a is expressed as a pulse signal PWM9b. A delay time of the delay circuit 104a of the sub-phase circuit SP8 is, for example, 8/(200 MHz×10). Therefore, the pulse signals PWM9a and PWM9b are signals delayed by a delay time of, for example, 8/(200 MHz×10) relative to the pulse signals PWM1a and PWM1b, respectively.

In the sub-phase circuit SP9, a gate signal of the transistor 108a is expressed as a pulse signal PWM10a, and a gate signal of the transistor 109a is expressed as a pulse signal PWM10b. A delay time of the delay circuit 104a of the sub-phase circuit SP9 is, for example, 9/(200 MHz×10). Therefore, the pulse signals PWM10a and PWM10b are signals delayed by a delay time of, for example, 9/(200 MHz×10) relative to the pulse signals PWM1a and PWM1b, respectively.

By connecting the ten phase circuits CP, SP1 to SP9 in parallel, the power supply device performs 10-phase driving. Thus, the power supply device can supply large power from the output node OUT. Further, by the 10-phase driving, the voltage Vout and current Iout of the output node OUT have a small fluctuation and becomes capable of performing stable power supply.

The above 10-phase multi-phase driving is possible because the frequencies of the pulse signals PWM1a to PWM10a, PWM1b to PWM10b are always constant at 200 MHz. If the frequency of the first pulse signal PWM fluctuates accompanying a load fluctuation, it is not possible to perform the stable multi-phase driving. According to this embodiment, there is an advantage that frequencies of the pulse signals PWM1a to PWM10a, PWM1b to PWM10b are always constant at a time of load fluctuation, stable multi-phase driving is possible, and large power can be supplied.

Figure 5:
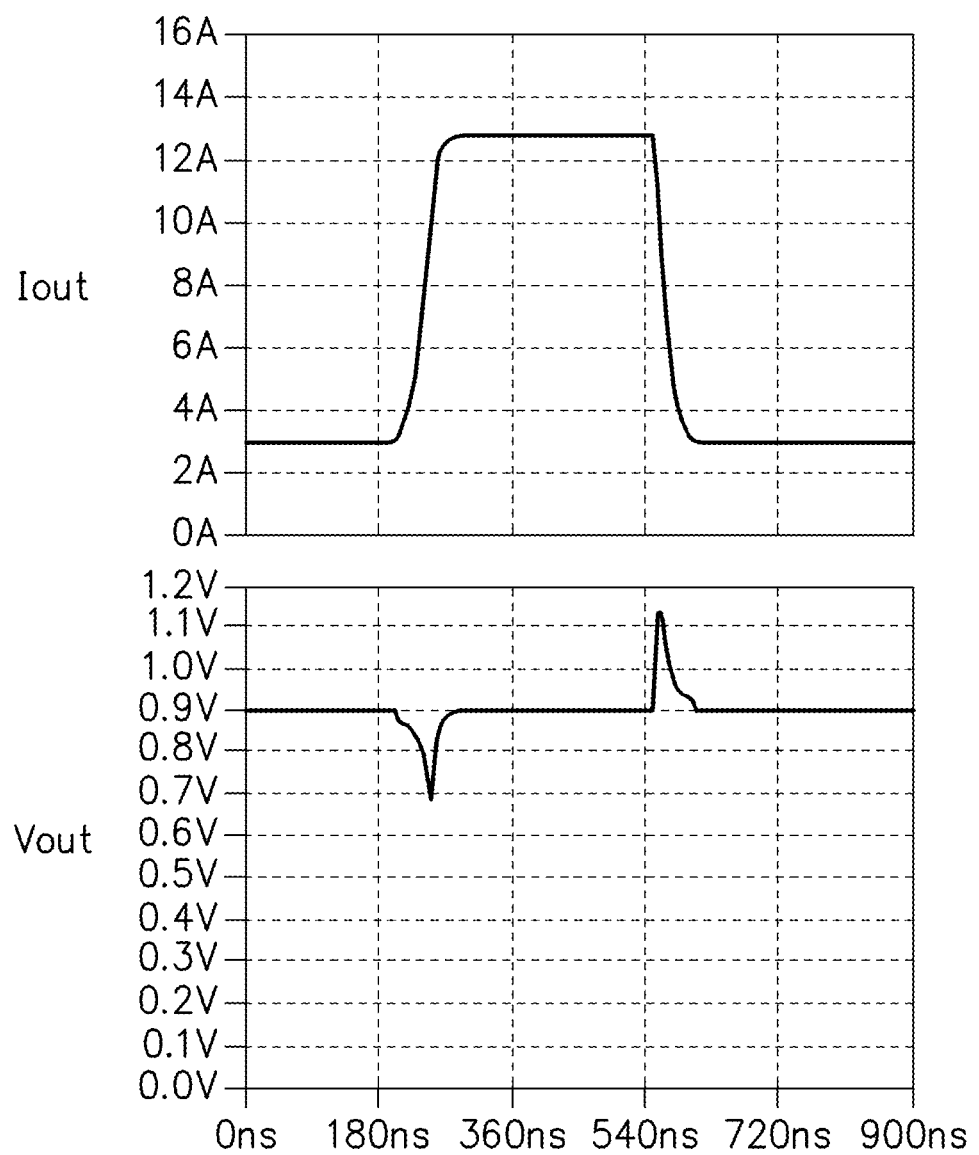
FIG. 5 is a waveform diagram of the output voltage and output current of an output node of the power supply device of FIG. 3.

FIG. 5 is a waveform diagram of the output voltage Vout and output current Iout of the output node OUT of the power supply device of FIG. 3, and illustrates the output voltage Vout and output current Iout when a load suddenly changes at a through rate of 2A/10 ns. Even when the load suddenly changes, the output voltage Vout can follow a sudden load change of 50 ms by a fluctuation within ±200 mV. By performing the 10-phase driving, a fluctuation of the output voltage Vout can be suppressed even when the load suddenly changes.

FIG. 6 is a graph illustrating the output voltage Vout and efficiency EF with respect to the output power. The output voltage Vout falls within 0.9 V±5%, having a small fluctuation. The efficiency EF has maximum efficiency of 89%, allowing obtaining high efficiency.

Third Embodiment

A power supply device according to a third embodiment is such that a voltage-controlled oscillator 102 changes a frequency of the first clock signal CK1 in the power supply device of FIG. 1. The voltage-controlled oscillator 102 outputs the first clock signal CK1 with a variable frequency according to a control voltage of the direct-current power supply 101. Hereinafter, differences of this embodiment from the first embodiment will be described.

Figure 7:
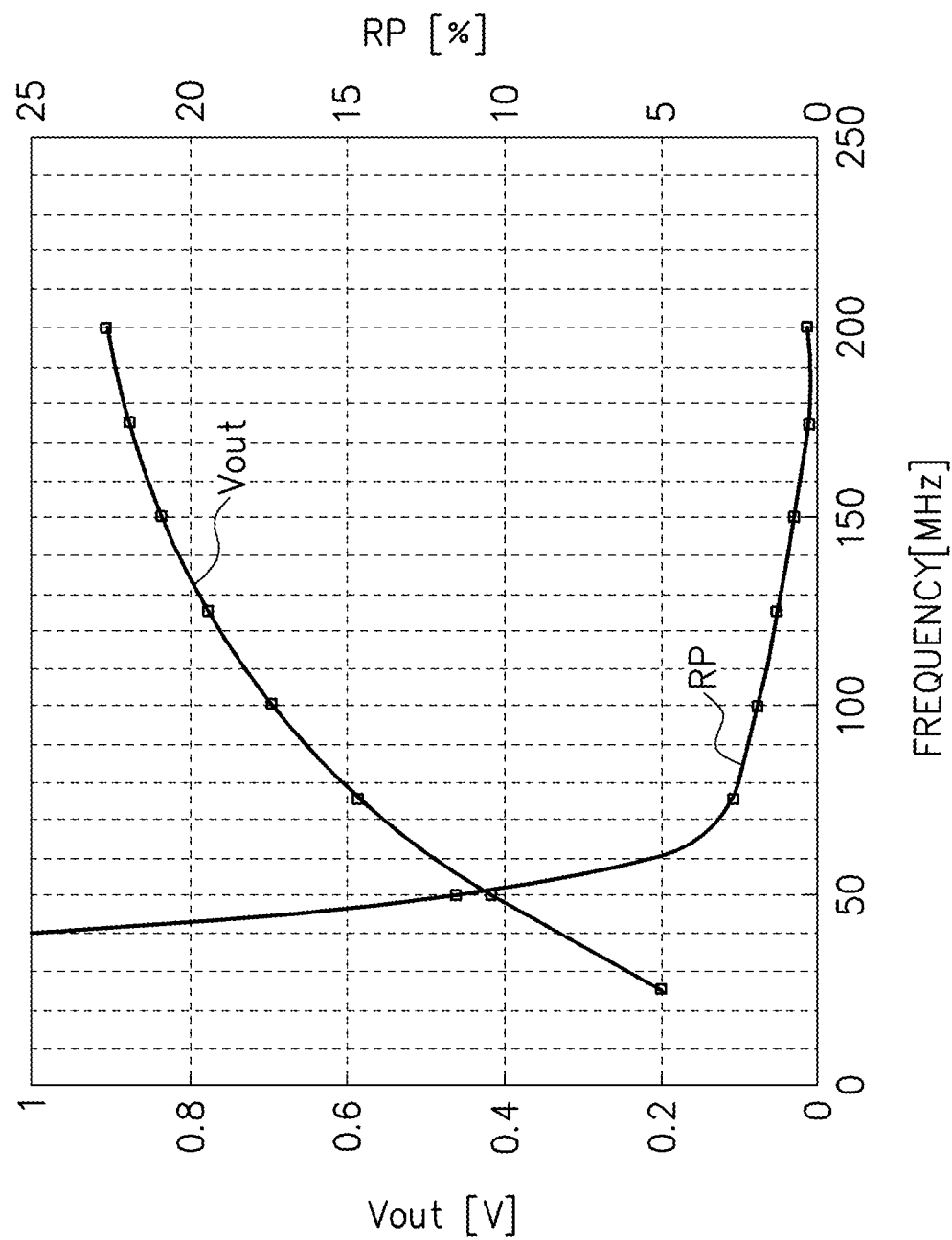
FIG. 7 is a graph illustrating an output voltage and a ripple relative to a frequency of a first clock signal.

FIG. 7 is a graph illustrating an output voltage Vout and a ripple RP relative to the frequency of the first clock signal CK1. The voltage Vout of the output node OUT changes according to a frequency of the first clock signal CK1. The higher the frequency of the first clock signal CK1, the higher the output voltage Vout. At this time, the output current Iout is constant. The ripple RP is a ratio of a pulsation component relative to a direct current component of the output voltage Vout, and the smaller its pulsation, the more it is preferred. The ripple RP becomes small when the frequency of the first clock signal CK1 is equal to or more than a predetermined frequency. When the output voltage Vout is 0.5 V or more, the ripple RP becomes 5% or less, allowing stable operation.

Figure 8:
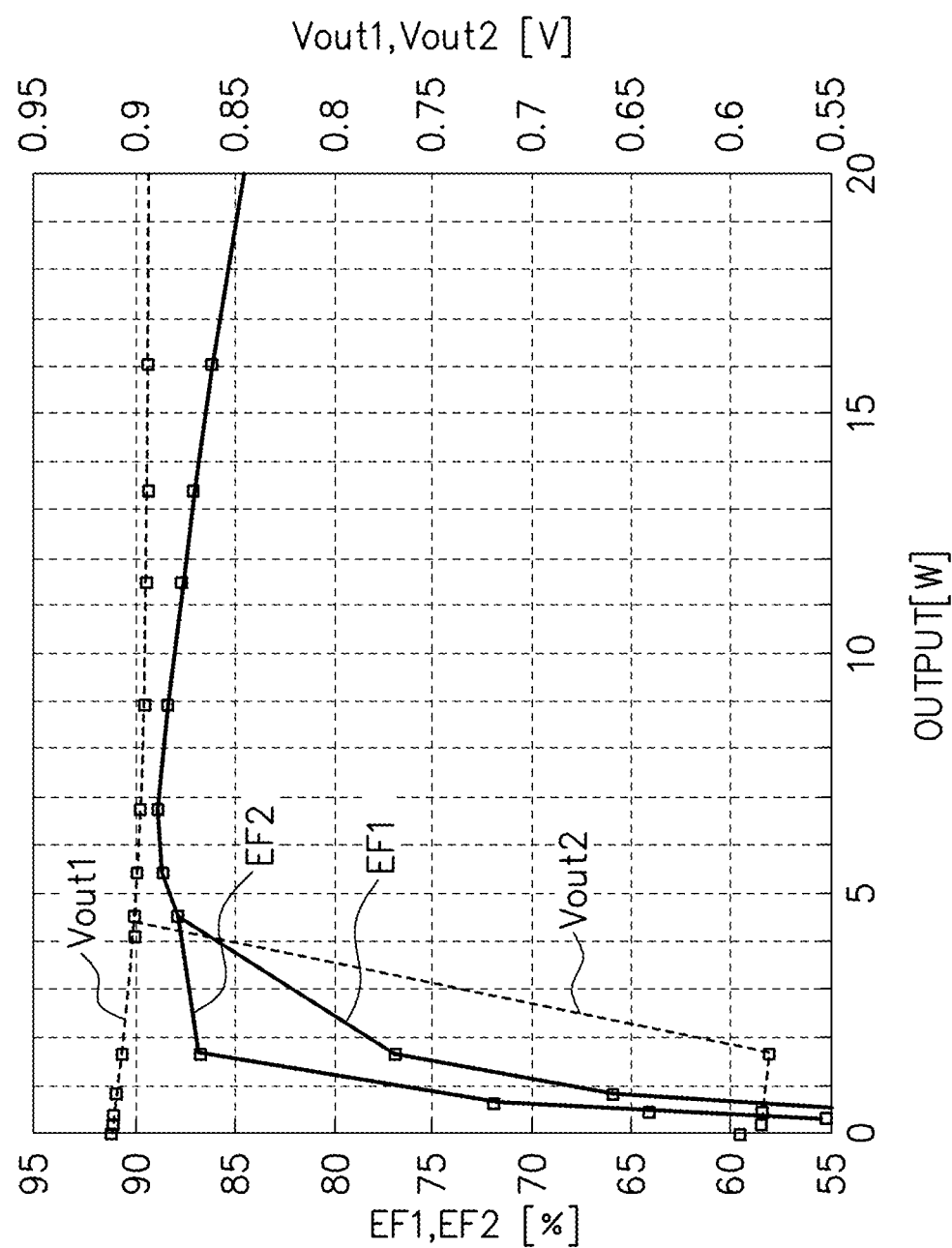
FIG. 8 is a graph illustrating output voltage and efficiency relative to the output power.

FIG. 8 is a graph illustrating output voltage Vout1, Vout2 and efficiency EF1, EF2 relative to the output power. The output voltage Vout1 indicates the output voltage Vout when the frequency of the first clock signal CK1 is 200 MHz. The efficiency EF1 indicates the efficiency when the frequency of the first clock signal CK1 is 200 MHz. The output voltage Vout2 indicates the output voltage Vout when the frequency of the first clock signal CK1 is 80 MHz. The efficiency EF2 indicates the efficiency when the frequency of the first clock signal CK1 is 80 MHz.

The voltage-controlled oscillator 102 controls the frequency of the first clock signal CK1 to 200 MHz or 80 MHz depending on the load. When the load is heavy, the output voltage Vout1 becomes approximately 0.9 V by setting the frequency of the first clock signal CK1 to 200 MHz, and thereby the efficiency EF1 at a time of large power output can be increased. On the other hand, when the load is light, by setting the frequency of the first clock signal CK1 to 80 MHz, the efficiency EF2 at a time of small power output can be increased. The processor (processing device) outputs a control signal to the voltage-controlled oscillator 102 depending on a load fluctuation. The voltage-controlled oscillator 102 changes the frequency of the first clock signal CK1 according to the control signal, to thereby supply power from the output node OUT to the processor. Thus, the power consumption of the processor can be reduced.

Figure 9:
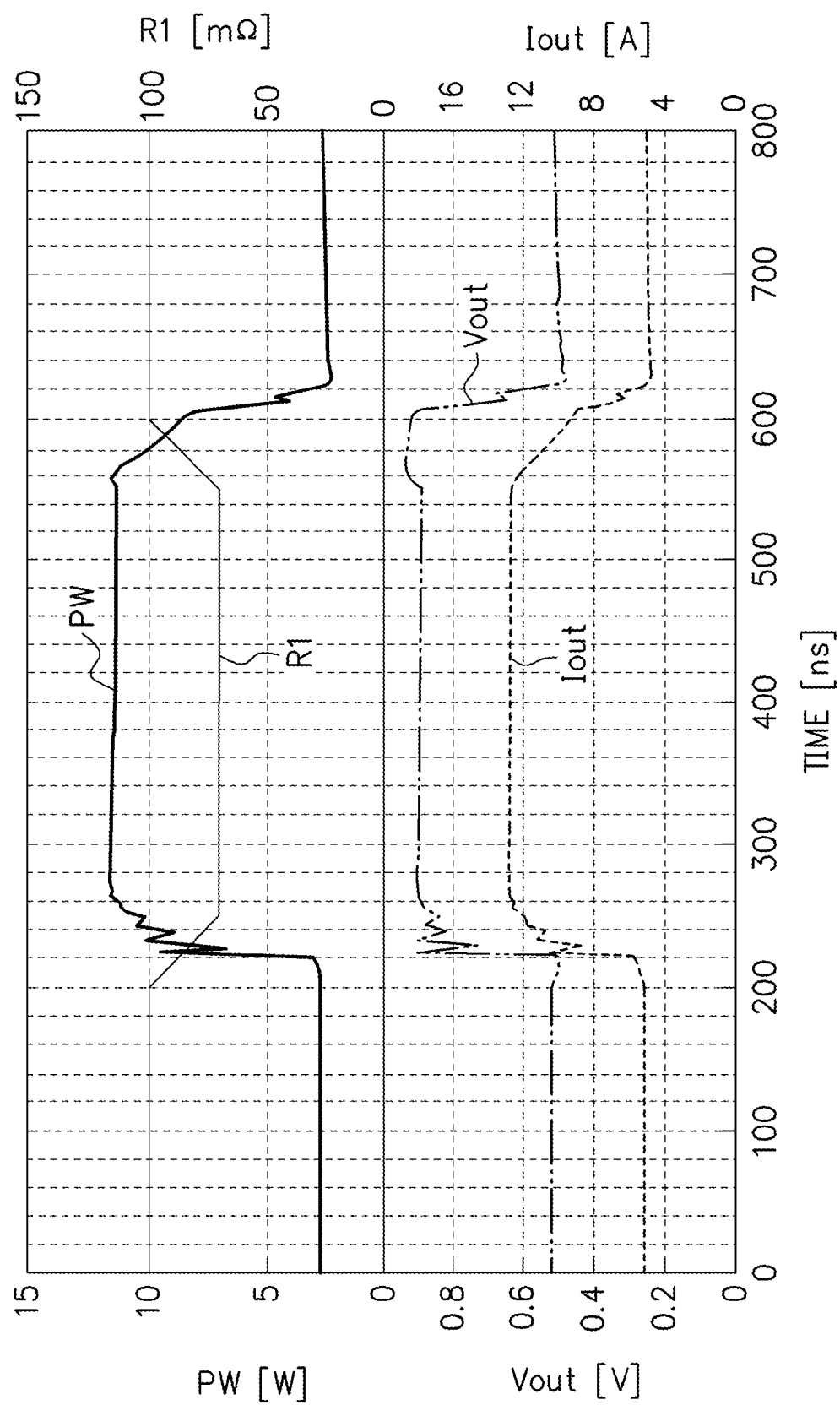
FIG. 9 is a diagram illustrating changes of output voltage, output current, load resistor and output power relative to time.

FIG. 9 is a diagram illustrating changes of output voltage Vout, output current Iout, load resistor R1 and output power PW relative to time. When the load resistor R1 changes suddenly, response characteristics of the output voltage Vout, the output current Iout and the output power PW can be made favorable by changing the frequency of the first clock signal CK1.

Fourth Embodiment

Figure 10:
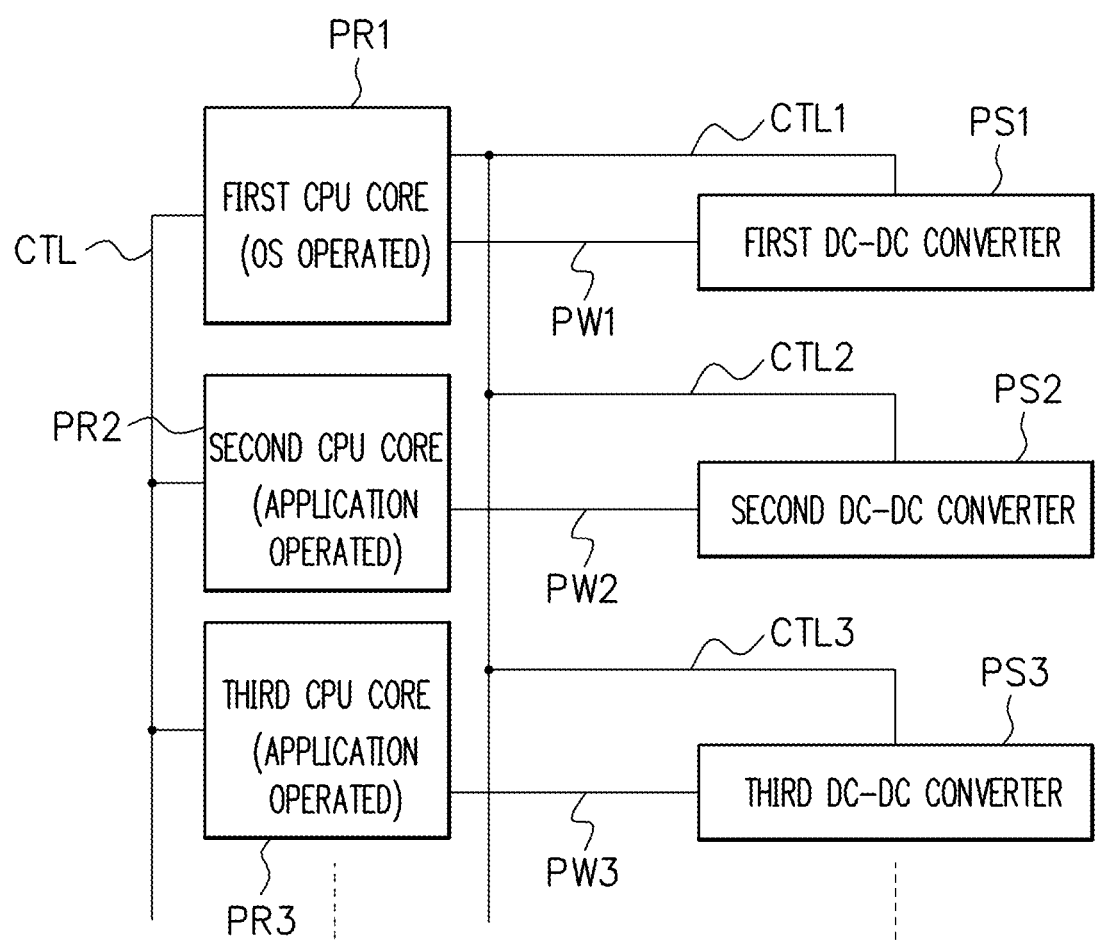
FIG. 10 is a diagram illustrating a structural example of power supply devices and processors (processing devices) according to a fourth embodiment.

FIG. 10 is a diagram illustrating a structural example of power supply devices PS1 to PS3 and processors (processing devices) PR1 to PR3 according to a fourth embodiment, and FIG. 12 is a flowchart illustrating a control method of the power supply devices PS1 to PS3 and the processors (processing devices) PR1 to PR3. The power supply devices PS1 to PS3 are DC-DC converters and are the power supply devices of the first to third embodiments. The processors PR1 to PR3 are CPU cores for example. The first CPU core PR1 is operated by an operating system (OS). The second CPU core PR2 and the third CPU core PR3 are operated by an application. The first CPU core PR1 controls a load variation of the CPU cores PR2 and PR3 by a control signal CTL.

In step S1201, the first CPU core PR1 outputs a control signal CTL1 to a first DC-DC converter PS1 depending on a load of the first CPU core PR1. In step S1202, the first DC-DC converter PS1 controls the frequency of the first clock signal CK1 according to the control signal CTL1, and supplies power (voltage) PW1 from the output node OUT to the first CPU core PR1.

Further, in step S1203, the first CPU core PR1 outputs a control signal CTL2 to a second DC-DC converter PS2 depending on a load of the second CPU core PR2. In step S1204, the second DC-DC converter PS2 controls the frequency of the first clock signal CK1 according to the control signal CTL2, and supplies power (voltage) PW2 from the output node OUT to the second CPU core PR2.

Further, in step S1205, the first CPU core PR1 outputs a control signal CTL3 to a third DC-DC converter PS3 depending on a load of the second CPU core PR3. In step S1206, the third DC-DC converter PS3 controls the frequency of the first clock signal CK1 according to the control signal CTL3, and supplies power (voltage) PW3 from the output node OUT to the third CPU core PR3.

As described above, the DC-DC converters PS1 to PS3 are provided in the CPU cores PR1 to PR3, respectively. The CPU core PR1 in which the OS is operating manages the loads of the other CPU cores PR2 and PR3, and outputs the control signal CTL of frequency control or the like to the other CPU cores PR2 and PR3. Further, the CPU core PR1 outputs the control signals CTL1 to CTL3 of frequency change to the DC-DC converters PS1 to PS3, respectively. The DC-DC converters PS1 to PS3 change the frequency of the first clock signal CK1 according to the control signals CTL1 to CTL3, respectively, and supplies power PW1 to PW3 to the CPU cores PR1 to PR3.

FIG. 11A is a waveform diagram of the frequency control signal Fr and the output voltage Vout when the load resistor R1 suddenly changes from high resistance to low resistance. The frequency control signal Fr corresponds to the control signals CTL1 to CTL3 of FIG. 10. When the load resistor R1 has high resistance, the frequency control signal Fr is at low level and the voltage-controlled oscillator 102 outputs the first clock signal CK1 with a low frequency. Then, the output voltage Vout becomes low voltage.

Next, several types of cases will be described where, when the load resistor R1 suddenly changes from high resistance to low resistance, the frequency control signal Fr is changed from low level to high level with a delay of 0 to several tens of ns therefrom. Then, the output voltage Vout changes from low voltage to high voltage. An overshoot of the output voltage Vout differs depending on the timing to change the frequency control signal Fr from low level to high level. Preferably, the timing to change the frequency control signal Fr from low level to high level is determined so that the overshoot of the output voltage Vout becomes minimum.

FIG. 11B is a waveform diagram of the frequency control signal Fr and the output voltage Vout when the load resistor R1 changes from low resistance to high resistance. When the load resistor R1 has low resistance, the frequency control signal Fr is at high level and the voltage-controlled oscillator 102 outputs the first clock signal CK1 with a high frequency. Then, the output voltage Vout becomes high voltage.

Next, several types of cases will be described where, when the load resistor R1 suddenly changes from low resistance to high resistance, the frequency control signal Fr is changed from high level to low level with a delay of 0 to several tens of ns therefrom. Then, the output voltage Vout changes from high voltage to low voltage. An undershoot of the output voltage Vout differs depending on the timing to change the frequency control signal Fr from high level to low level. Preferably, the timing to change the frequency control signal Fr from high level to low level is determined so that the undershoot of the output voltage Vout becomes minimum.

For example, the overshoot or undershoot of the output voltage Vout can be minimized by changing the frequency control signal Fr with a delay of 0 to several tens of ns relative to a start of sudden change of the load resistor R1. If the frequency of the first clock signal CK1 is switched after a change of the output voltage Vout or load power is detected, the fluctuation of the output voltage Vout becomes too large. The CPU core PR1 in which the OS is operating recognizes loads of the CPU cores PR1 to PR3, and thus the overshoot or undershoot of the output voltage Vout can be minimized by controlling the frequency of the first clock signal CK1 of the DC-DC converters PS1 to PS3 by the control signals CTL1 to CTL3.

As described above, according to the first to fourth embodiments, even when the voltage of the output node fluctuates accompanying a load fluctuation, a switching frequency of the first and second transistors 108 and 109 can be made constant. Thus, it becomes possible to supply large power from the output node.

It should be noted that the present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power supply device, comprising:
   a first delay circuit which delays a first clock signal and outputs a second clock signal;
   a pulse signal generating circuit which generates a first pulse signal in synchronization with the first clock signal;
   a first transistor which connects an output node to a power supply potential node according to the first pulse signal;
   a second transistor which connects the output node to a reference potential node according to the first pulse signal;
   an integration circuit which integrates and outputs a signal of the output node; and
   a comparator which compares an output signal of the integration circuit and the reference signal, wherein
   the first transistor and the second transistor perform on and off operations which are reverse to each other,
   the pulse signal generating circuit sets the first pulse signal to first level in synchronization with the first clock signal, sets the first pulse signal to second level in synchronization with the second clock signal, and sets the first pulse signal to the second level in synchronization with an output signal of the comparator, and
   the frequency of the first pulse signal is constant irrespective of voltage of the output node.

2. The power supply device according to claim 1, further comprising:
   an edge extracting circuit which extracts an edge of the output signal of the comparator and outputs an edge signal; and
   a logical sum circuit which outputs a logical sum signal of the second clock signal and the edge signal to the pulse signal generating circuit.

3. The power supply device according to claim 1, further comprising:
   a second delay circuit which delays the first pulse signal and outputs a second pulse signal;
   a third transistor which connects the output node to the power supply potential node according to the second pulse signal; and
   a fourth transistor which connects the output node to the reference potential node according to the second pulse signal, wherein
   the third transistor and the fourth transistor perform on and off operations which are reverse from each other.

4. The power supply device according to claim 1, further comprising
   a voltage-controlled oscillator which outputs the first clock signal with a variable frequency according to control voltage, wherein
   the voltage of the output node changes according to a frequency of the first clock signal.

5. The power supply device according to claim 4, wherein the voltage-controlled oscillator changes a frequency of the first clock signal according to control of a processing device.

6. The power supply device according to claim 5, wherein the output node supplies voltage to the processing device.

7. The power supply device according to claim 1, wherein the first and second transistors are field-effect transistors.

8. The power supply device according to claim 1, wherein the first and second transistors are high electron mobility transistors.

9. The power supply device according to claim 1, wherein the first level is high level and the second level is low level.

* * * * *